(12) United States Patent
Colarusso

(10) Patent No.: US 11,009,014 B2
(45) Date of Patent: May 18, 2021

(54) ROTARY MOTOR

(71) Applicants: Ciriaco Natale Colarusso, Cassino (IT); Vincenzo Ruggero, Cervaro (IT)

(72) Inventor: Ciriaco Natale Colarusso, Cassino (IT)

(73) Assignees: Ciriaco Natale Colarusso, Cassino (IT); Vincenszo Ruggero, Cervaro (IT)

( * ) Notice: Subject to any disclaimer, the term of this patent is extended or adjusted under 35 U.S.C. 154(b) by 132 days.

(21) Appl. No.: 16/304,992

(22) PCT Filed: May 26, 2017

(86) PCT No.: PCT/IB2017/053106
§ 371 (c)(1),
(2) Date: Nov. 27, 2018

(87) PCT Pub. No.: WO2017/203475
PCT Pub. Date: Nov. 30, 2017

(65) Prior Publication Data
US 2019/0162173 A1   May 30, 2019

(30) Foreign Application Priority Data
May 27, 2016   (IT) .................... 102016000055109

(51) Int. Cl.
*F03G 7/10*   (2006.01)
(52) U.S. Cl.
CPC ..................... *F03G 7/10* (2013.01)
(58) Field of Classification Search
CPC ................ F03G 7/10; F03G 3/00; F03G 3/08
See application file for complete search history.

(56) References Cited

U.S. PATENT DOCUMENTS

| | | | | |
|---|---|---|---|---|
| 5,057,696 A | * | 10/1991 | Thomas | F03D 7/06 290/44 |
| 6,570,296 B1 | * | 5/2003 | Iino | H02N 2/126 310/323.02 |
| 2008/0174121 A1 | * | 7/2008 | Wattenbarger | H02K 53/00 290/1 R |
| 2008/0223636 A1 | * | 9/2008 | Gutsche | F03G 7/10 180/65.31 |
| 2008/0231055 A1 | * | 9/2008 | Nadel | F03B 13/20 290/53 |

(Continued)

FOREIGN PATENT DOCUMENTS

| | | | |
|---|---|---|---|
| WO | WO 2014/082374 A1 | 6/2014 | |
| WO | WO 2016/009233 A1 | 1/2016 | |
| WO | WO-2016136112 A1 * | 9/2016 | ........... H02K 7/1853 |

OTHER PUBLICATIONS

Angrist, Stanley W.; "Perpetual Motion Machines", Scientific American, Scientific American Inc., New York, NY, US, vol. 218, No. 1, Jan. 1, 1968, pp. 114-122.

(Continued)

*Primary Examiner* — Tulsidas C Patel
*Assistant Examiner* — Joseph Ortega
(74) *Attorney, Agent, or Firm* — Arent Fox LLP

(57) ABSTRACT

A motion generator, comprising several levers inserted in a variable positioning mobile system to compress, or to expand, elastic or magnetic components, by using them as energy storage devices which discharge the energy stored on one or more cranks connected to an output member from which the motion can be taken.

12 Claims, 7 Drawing Sheets

(56) References Cited

U.S. PATENT DOCUMENTS

| | | | | |
|---|---|---|---|---|
| 2010/0242672 A1* | 9/2010 | Gutsche | ............ | F03G 3/08 |
| | | | | 74/84 R |
| 2013/0047754 A1* | 2/2013 | Condric | ............ | F03G 7/10 |
| | | | | 74/61 |
| 2013/0257060 A1* | 10/2013 | Horng | ............ | F03G 3/02 |
| | | | | 290/1 R |
| 2015/0021923 A1* | 1/2015 | Huang | ............ | H02K 53/00 |
| | | | | 290/1 A |
| 2015/0204300 A1* | 7/2015 | Kasten | ............ | F03B 17/00 |
| | | | | 290/52 |
| 2015/0333574 A1* | 11/2015 | Baek | ............ | H02K 1/17 |
| | | | | 310/68 B |
| 2016/0237992 A1* | 8/2016 | Chicoski | ............ | F03G 3/00 |

OTHER PUBLICATIONS

Hume A W J G ED—Ord-Hume A; "Perpetual Motion: The history of an obsession" Jan. 1, 1994, Perpetual Motion. History of an Obsession, New York, St. Martin's Press, US, pp. 58-75.
International Search Report and Written Opinion issued in International Application No. PCT/IB2017/053106 dated Aug. 22, 2017.
Wadlow, Christopher; "Patents for perpetual motion machines", Journal for Intellectual Property Law & Practice, Oxford University Press, Oxford, GB, vol. 2, No. 3, Jan. 1, 2007, pp. 136-144.

* cited by examiner

ROTARY MOTOR

CROSS-REFERENCE TO RELATED APPLICATION

This application is a 35 U.S.C. § 371 National Phase Application of PCT Application No. PCT/IB2017/053106 filed May 26, 2017, which claims priority to IT Application No. 102016000055109 filed May 27, 2016. The disclosure of these prior applications are hereby incorporated by reference herein in their entirety.

The present invention relates to a rotary motor, that is a rotary motion generator, comprising several levers inserted in a variable positioning mobile system to compress, or in case to expand, elastic or magnetic components, by exploiting in this case the attraction or repulsion due to the nature of the same, by using them as energy storage devices which discharge the energy stored on one or more cranks connected to an output member therefrom the motion can be taken.

DESCRIPTION OF PRIOR ART

The main types of engines use thermal reactions and electric energy for producing the motion. In case of gasoline-, diesel- or gas-powered endothermal engines, generally the performance is very low, since only a small portion of the energy produced during the thermal reaction is converted into motion. In fact most part of the produced energy is dispersed in the surrounding environment under the form of heat, by inletting into the environment itself the exhaust gases produced by the combustion.

Disadvantages of the Prior Art

The main disadvantages of the two mentioned examples are due to the fact that they produce the motion by not using energy primary sources existing on the earth, on the contrary they use energy sources produced by transformation by primary energy sources.
An energy transformation process, like each productive process, has both advantages and disadvantages, both in terms of real use and of environmental pollution.

OBJECTS OF THE INVENTION

The object of the present invention is to transform energy in a simple, cheap and clean way, by solving the mentioned disadvantages of the existing systems. This is obtained by means of a rotary motion generator as defined in claim 1.

Additional features of the present invention are defined in the corresponding depending claims.

According to the present invention, several levers are used inserted in a variable positioning mobile system, by applying the laws of physics relating the angular momentum of a body which rotates with respect to a point in the space.

The levers are machines of simple type which transform the motion and they are an application of the principle of equilibrium of momentums, wherein the sum of the momentums of the forces applied to a stiff body is equal to zero.

They are constituted by two arms integral therebetween which rotate with the same angle, with the same angular speed and which are hinged to a fulcrum around thereof they are free to rotate. The ratio between the sizes of the arms and of the fulcrum positioning determines the ratio between resistance force and force to be applied to reach the equilibrium of the forces' momentums, or to obtain an increase in the force momentum.

The features of the levers are exploited to reduce the inlet force required to compress or in case expand elastic or magnetic components. In this case, the attraction or the repulsion due to the nature of the same is exploited, by using them as energy storage devices which discharge the energy stored on one or more cranks connected to a rotating axis, by obtaining a motion having duration and intensity equal to the stroke and to the force of the used elastic or magnetic bodies.

After the elastic or magnetic bodies have discharged the energy deriving from the compression or expansion thereof, the operation point of the lever or of the system of several levers combined therebetween and inserted in the mobile system is shifted and a new compression or expansion phase is started again.

By repeating cyclically this sequence a motion of continuous impulsive type is obtained.

By connecting to the rotating axis a multiplier and kinetic energy storage device, the possible practical applications are extended and the motion itself is adjusted.

The energy required of the mobile system is provided by electromechanical systems (for example an electric motor) which should be powered by electric energy coming from external sources, such as for example a battery or an electricity production network.

Furthermore, the parameters of position and operation of the mobile system, in which the lever or the system of several levers combined therebetween work, can be varied to maximize the performance thereof.

Its natural application is in all cases wherein a rotating axis is required to carry out a mechanical work.

Advantages of the Invention

In this third millennium, one of the biggest problems which the scientific world is facing with greater diligence is the effectiveness improvement and the energy saving, in all technical fields. Nowadays the boundary line is represented by the innovative and alternative energy sources, wherein answers are looked for and therefrom answers are expected, both for saving and for environmental protection, the reduction in the carbon dioxide emissions, co-responsible for the greenhouse effect and the consequent climatic variations, being absolutely necessary. It is also necessary to consider that the primary energy sources of fossil type on our planet are constantly decreasing and this, in the next years, is a fact which will have to be faced.

The motion generator, thereto the present invention relates, by overcoming the mentioned problems of the prior art, distinguishes for its high effectiveness and consequently it has the capability of producing mechanical energy at an acceptable cost.

It has low noise during its operation and it does not use any type of fossil fuel to produce the motion, then it has no exhaust gas emission during its operation, by eliminating all the problems connected to the environmental pollution.

The motion generator, thereto the present invention relates, highlights several and additional advantages, as it will result clear later from the detailed description of a preferred embodiment thereof, herein shown by way of example and not for limitative purpose.

Its implementation is quite simple, the environmental impact for the production of the required components is definitely low, since there is not any type of production of special or dangerous waste. In fact, these are usual activities connected to the mechanical, electronic and electric production. Moreover, the levers are particularly interesting for their features of high effectiveness and reliability. Among the advantages connected to the use thereof, it can be mentioned that they have a high operation duration, a high performance in the provided cases and they involve practically negligible maintenance costs.

Another important aspect relates to the engine duration, since, as it is a relatively simple machine, it requires reduced maintenance, by reducing costs and time connected to the maintenance during the whole life of the motion generator thereto the present invention relates.

Additional advantages, as well the features and the use modes of the present invention, will result evident from the detailed description of preferred embodiments, shown by way of example and not for limitative purpose.

BRIEF DESCRIPTION OF THE DRAWINGS

The drawings shown in the enclosed figures will be referred to, wherein.

The present invention will be described hereinafter with reference to the above-mentioned figures.

DETAILED DESCRIPTION OF THE INVENTION

Figure 1:
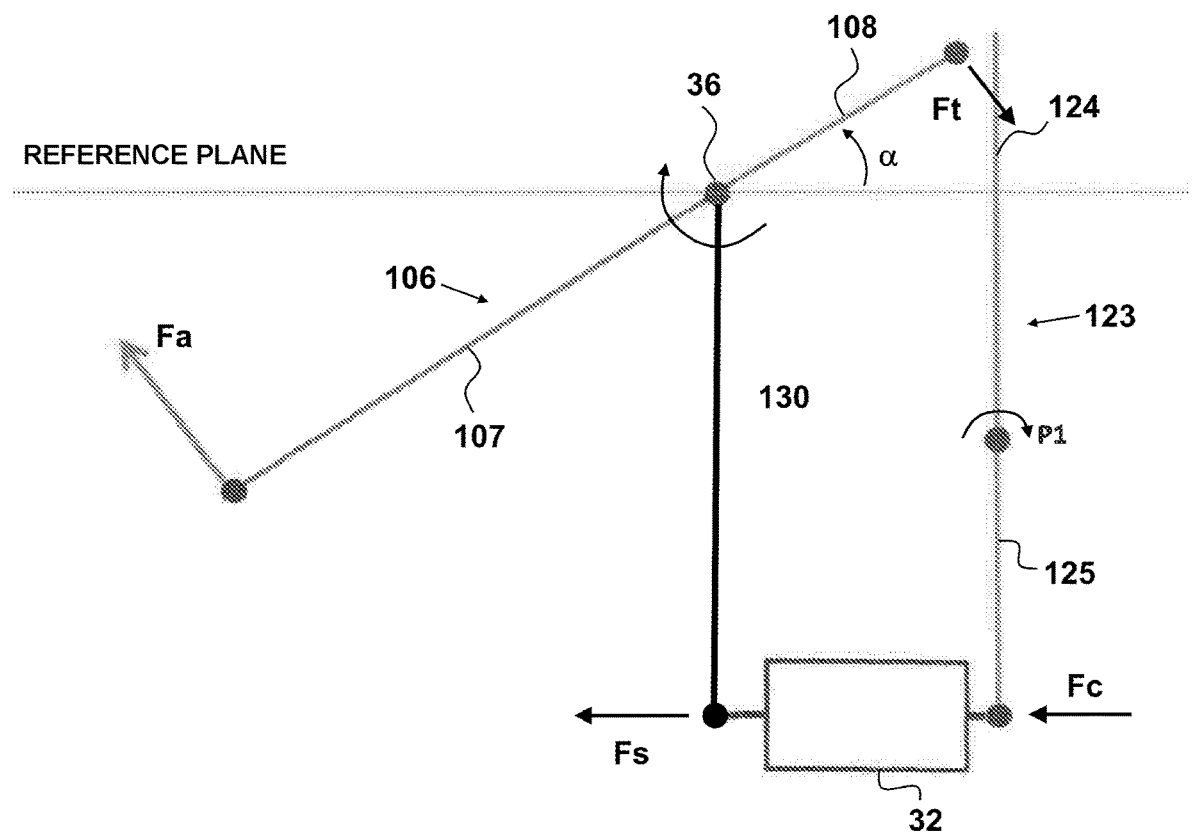
FIG. 1 illustrates schematically the operation principle of a motion generator according to the present invention.

With reference to FIG. 1 the operation principle of a motion generator according to the present invention is shown schematically.

In particular, a generator according to the present invention first of all comprises at least one energy storage component 32 activated by actuating means, in particular electro-mechanical systems.

The energy storage component 32 is connected to an output member 36 therefrom the generated motion is taken.

Hereinafter in the description the energy storage component 32 will be referred to, by describing it as an elastic member, for example a spring. However, it is to be meant that such energy storage component 32 could even have different nature, for example it could be implemented with a pair of components of magnetic type, provided that they have the capability of storing energy, if subjected to an outer action in presence of mechanical constraints, and releasing such stored energy when such constraints are removed.

The output member 36 for example can be a rotating output axis, therefrom the generated motion is to be taken.

The generator further comprises a lever system for the application of a charging force Fc to the energy storage component 32.

The lever system can comprise a primary lever 106 placed so as to exert a transferring force Ft on a transferring lever 123.

The transferring lever 123 is arranged so as to exert a charging force Fc on one energy storage component 32.

The levers of the lever system can be actuated by corresponding actuating means managed by a control unit 34, so that the charging force Fc is cyclically applied to the energy storage component 32. According to the present invention, one cycle comprises a charging phase wherein the charging force Fc is applied to the energy storage component 32, which during this phase stores energy, alternated to a release phase, during thereof the energy storage component 32 releases the previously stored energy.

As the output member 36 is connected to the energy storage component 32 by means of a crank 130, it is cyclically moved by the energy released by the energy storage component 32 during the release phases.

According to the described embodiment, an actuation force Fa can be then applied to the motor arm 107 of the primary lever 106, which transfers it—according to its own ratio between motor arm 107 and resistance arm 108—to the transferring lever 123, which in turn—still according to its own ratio between motor arm 124 and resistance arm 125—transfers it to the energy storage component 32.

The fulcrum of the primary lever 106 substantially coincides with the rotating axis 36. The fulcrum of the transferring lever 123 substantially coincides with the rotating axis P1.

Advantageously, the lever system further comprises a crank 130, hinged in the fulcrum of the primary lever 106, so as to receive a shifting force Fs from the energy storage component 32 during each release phase.

At this point, by making that all could rotate around the rotating axis 36—which represents even the fulcrum of the primary lever 106—upon each new cycle the energy storage component 32 will be subjected to a new charging phase and then it will release energy in a subsequent release phase, by causing a new shifting of the output member. The sequence of such shiftings translates into a rotation of the rotating axis 36.

Figure 2:
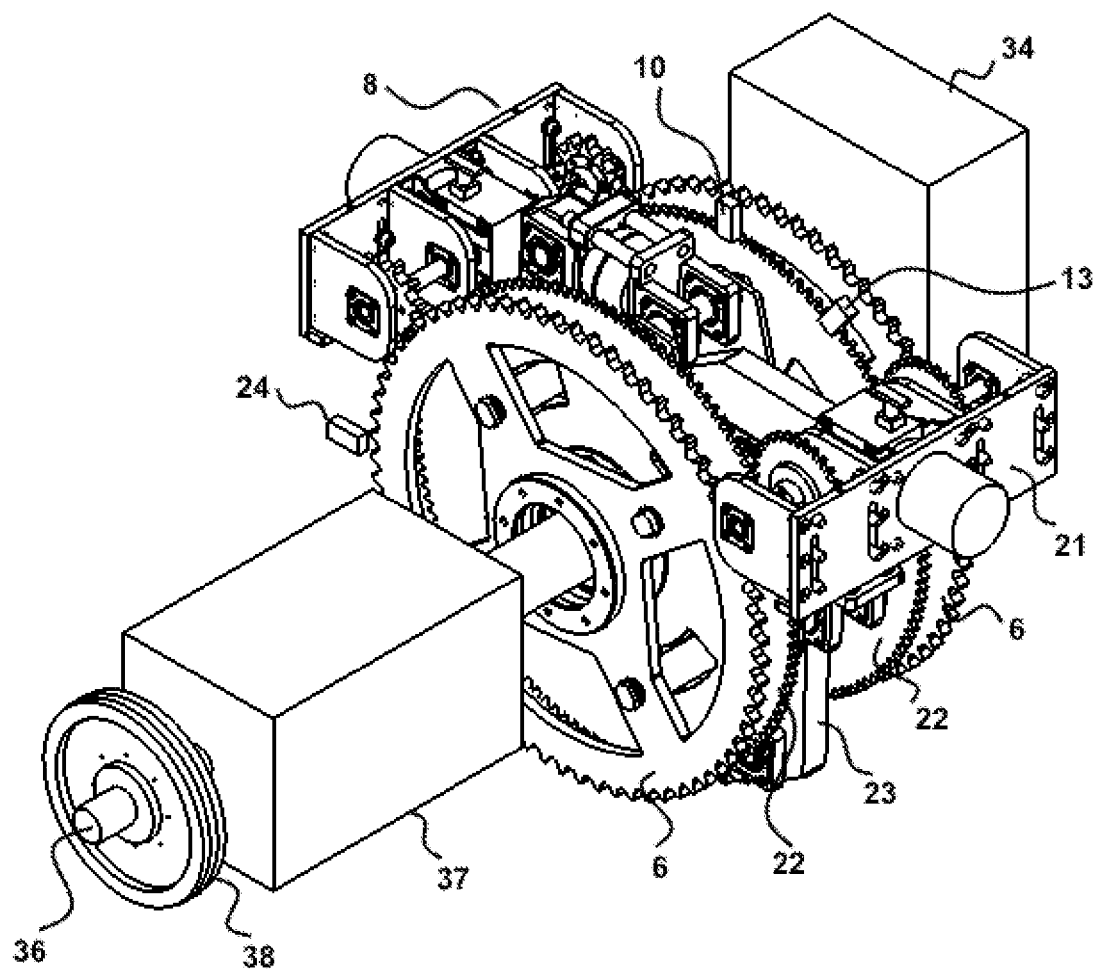
FIG. 2 illustrates, in a perspective way, a system for the motion generation, thereto the present invention relates, according to a preferred embodiment, shown by way of example and not for limitative purpose.

The motion generator, just described in general terms, according to the present invention, can be possibly implemented in the machine shown in FIG. 2, showing an overall perspective view of the motion generator.

Figure 3:
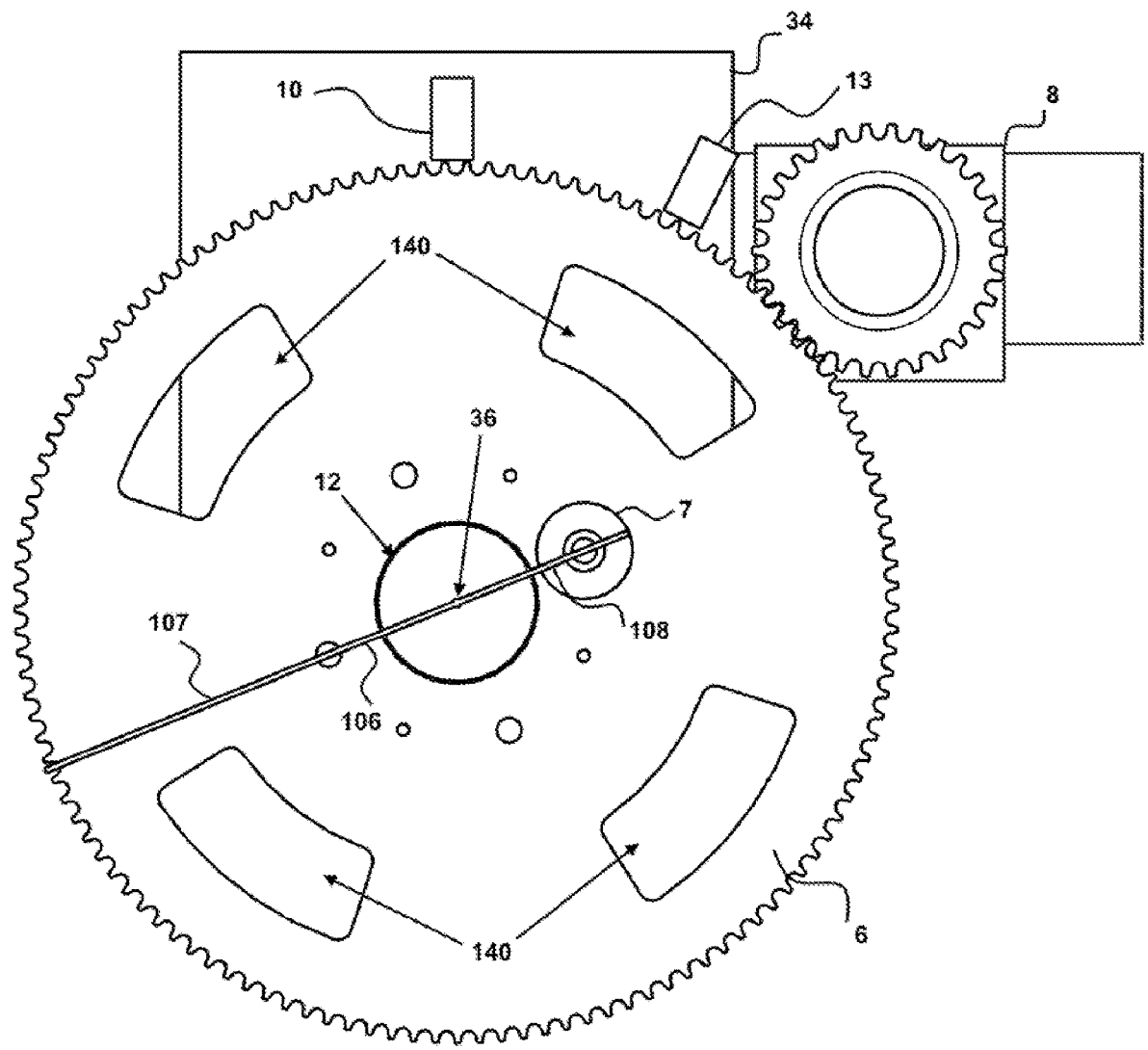
FIG. 3 illustrates the block performing the function of mobile lever.
Figure 4:
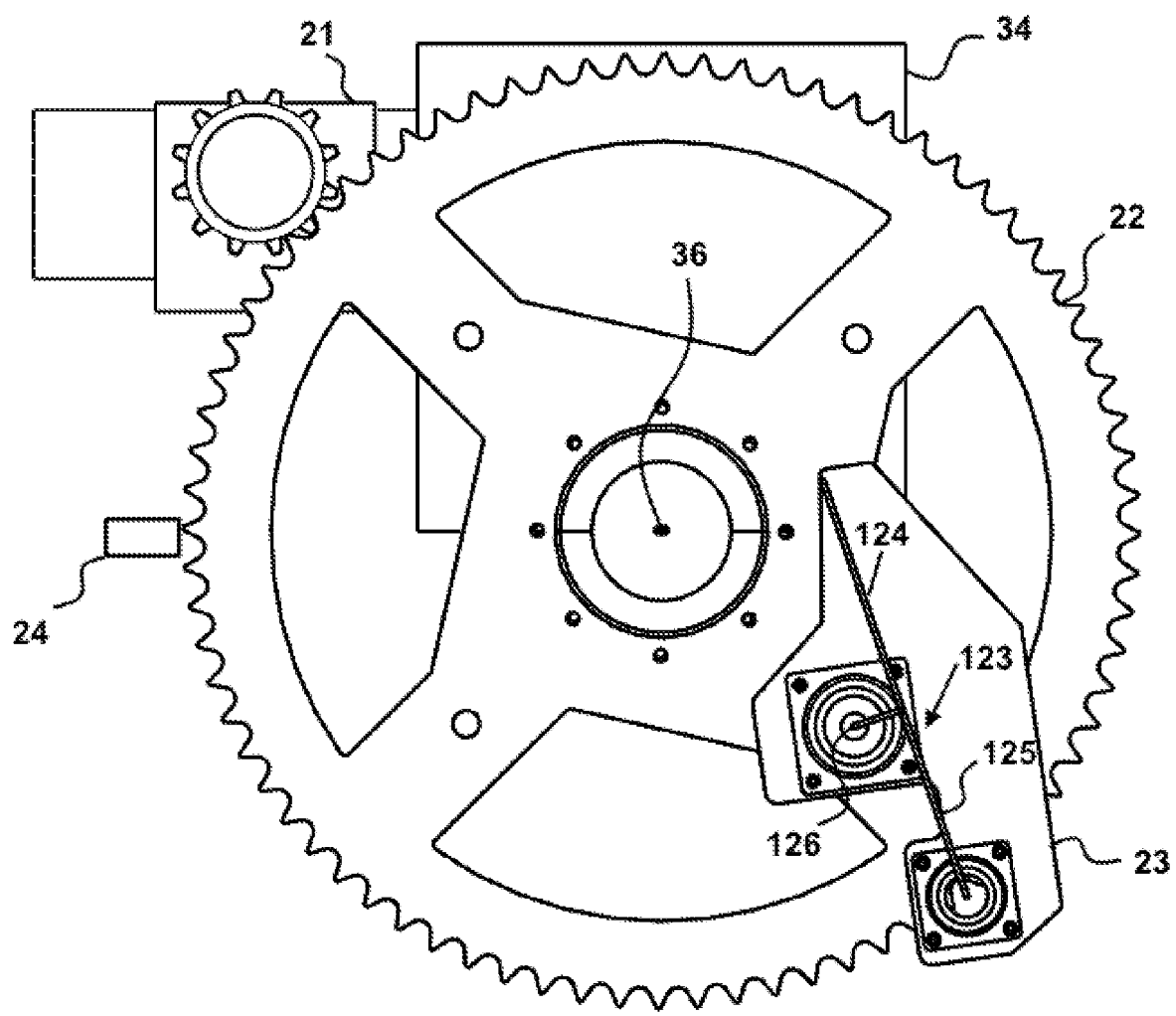
FIG. 4 illustrates the block performing the function of mobile fulcrum.
Figure 5:
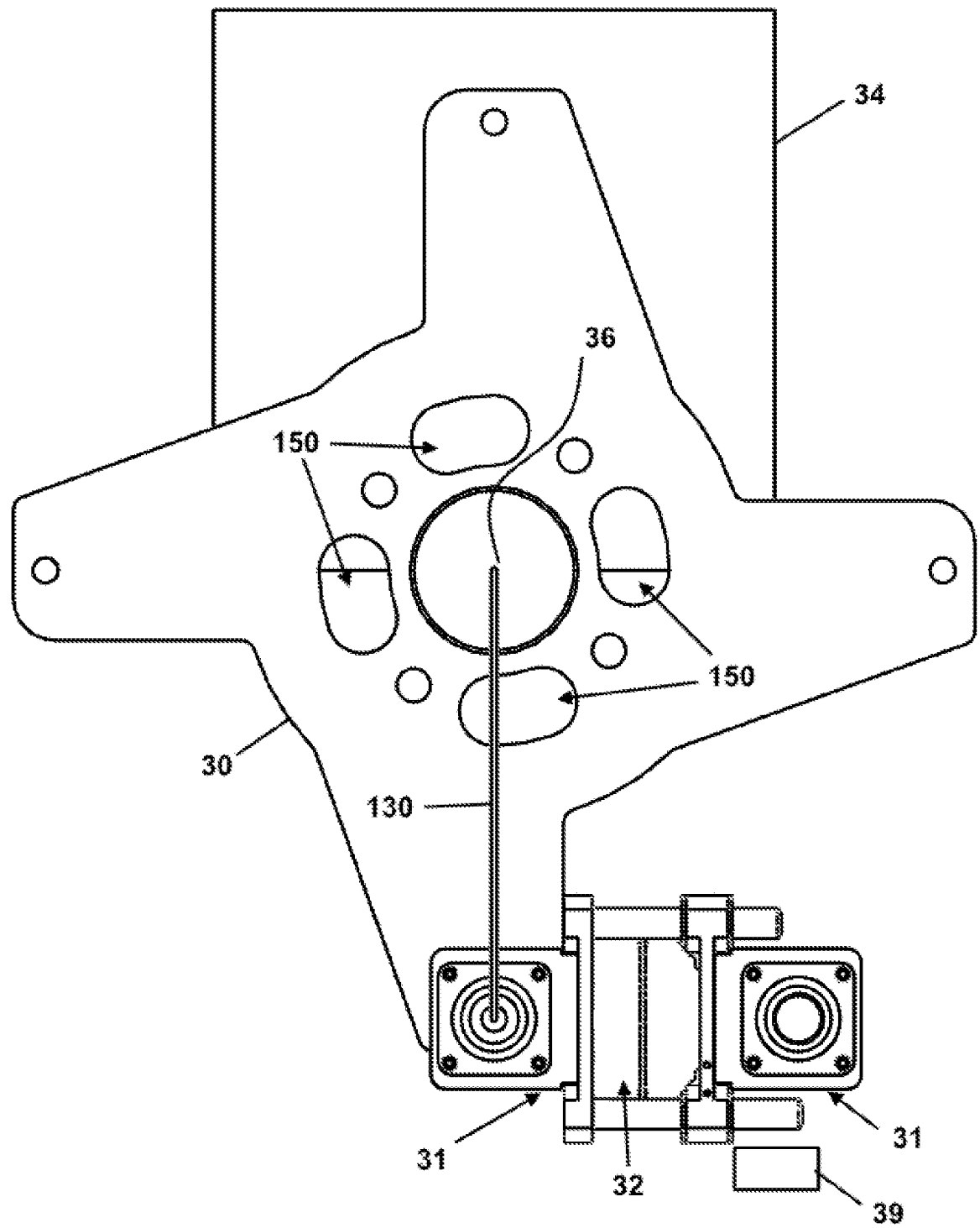
FIG. 5 illustrates a four-arm crank with the mobile slides for elastic or magnetic components.
Figure 6:
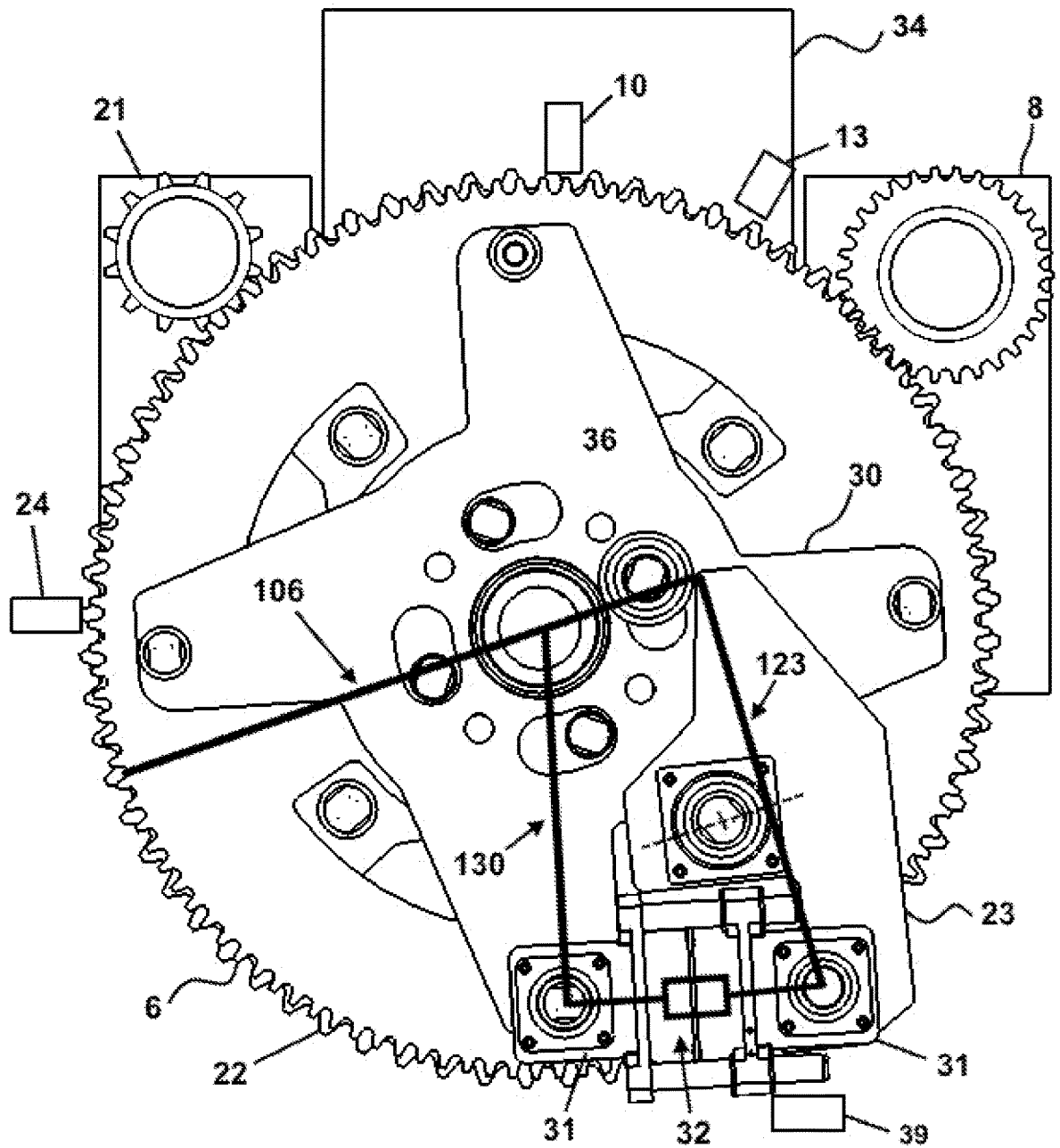
FIG. 6 illustrates the set of the elements shown in FIGS. 3 to 5.

The subsequent FIGS. 3, 4 and 5 instead show, separately, the main components of the generator. At last FIG. 6 shows the correspondence between the above-mentioned components and the before described lever system.

In FIG. 3 a primary disc 6 is represented carrying out the function of primary lever 106. The primary disc 6 is rotating around an axis—preferably coincident with the rotating axis 36 acting as output member. The primary disc 6 bears a cam element 7, for example a ball bearing. The primary lever 106 has the fulcrum at the rotation centre of the primary disc 6, a first motor arm 107 equal to the radius of the primary disc 6 and a second resistance arm 108, corresponding to an extension of the motor arm, extending from the centre 36 as far as a point intersecting with the outer surface of the cam element. Such intersection point corresponds to the point in contact with the transferring lever 123, as it can be well seen from FIG. 6.

The subsequent FIG. 4 instead shows a secondary disc 22. The secondary disc 22 is assembled coaxially to the primary disc 6 and it can rotate around the same axis 36 independently from the primary disc 6.

On the secondary disc 22 a transferring pivoting member 23 is assembled, acting as transferring lever 123, hinged at the fulcrum 126 which advantageously will be positioned along a radius of the secondary disc 22.

The primary disc 6 and the secondary disc 22 are overlapped therebetween, so that the fulcrum 126 of the transferring lever 23 falls in one of the primary slots 140 obtained on the same primary disc 6. In other words, the primary disc 6 is assembled so as to lie between the secondary disc 22 and the transferring pivoting member 23.

As illustrated in FIG. 5, according to a possible embodiment of the invention the crank 130 is implemented as a rotating member 30, in turn hinged at the centre 36 of the primary disc 6 and of the secondary disc 22. Therefore, the crank 130 is implemented by the portion of rotating member 30 comprised between the rotation centre 36 and the peripheral end of the rotating member 30 itself, thereat it is connected to a free end of the energy storage component 32. The other end of the energy storage component 32 will be connected to the transferring pivoting member 23.

Of course, even the rotating member 30 can rotate around the same rotation axis of the primary disc 6 and of the secondary disc 22, independently therefrom.

The rotating member 30 in turn is comprised between the primary disc 6, 22 and in line with the transferring lever 23. Advantageously, the rotating member 30 has passage slots 150 for the cam element 7, which is destined to cooperate with the motor arm 124 of the transferring lever 123 during the operation.

As already indicated, the generator according to the present invention, in order to be able to operate, requires means for actuating the lever system.

In particular, according to the herein described embodiment, the actuating means comprises a first motorized electro-mechanical system 8, controlled so as to make the primary disc 6 to rotate during the charging phases, and a second motorized electro-mechanical system 21, controlled so as to brake the secondary disc 22 during the charging phases and to reposition it after the discharging phase for the subsequent charging phase.

As said before, the above-mentioned motorized electromechanical systems 8, 21 are fed by an external electric power source, for example a battery, not represented in the enclosed figures.

In general terms, the motorized electromechanical system 8 of the primary disc 6 and the motorized electromechanical system 21 of the secondary disc 22 are controlled so as to bring, after each release phase, the primary disc 6 and the secondary disc 22, respectively, in a position corresponding to the beginning of a subsequent cycle.

By way of example, the connection between the motors 8 and 21 and the primary disc 6 and the secondary disc 22 can be of the type with toothed wheels. However, it is to be meant that—in equivalent manner—other solutions implementing the primary disc 6 and the secondary disc 22 can be adopted.

First position sensors 10 and 13, connected to a control unit 34, are used to synchronize the motion of the primary disc 6, according to an operation which will be described more in details hereinafter.

A third position sensor 24, connected to a control unit 34 is used to synchronize the motion of the secondary disc 22, according to an operation which will be described more in details hereinafter.

A fourth position sensor 39, connected to a control unit 34, is used to consent to the occurred full charge according to an operation which will be described more in details hereinafter.

The subsequent FIG. 6 shows the group of discs and levers described up to now, in an assembly configuration.

Moreover, in the drawing the schematic representations of the primary lever 106, of the transferring lever 123, of the spring implementing the energy storage component 32 and of the crank 130 are shown.

The operation sequence for the motion generation is the following one.

The primary disc 6, performing the function of primary lever 106, rotating as previously described, is put in motion and subsequently locked by the motorized electromechanical system 8, in a predetermined position, corresponding to a position of end of charging cycle as defined so far. Such position can be determined by a sensor 13 connected to the control electronic circuit 34, which will control the motorized electromechanical system 8 with implemented acceleration compensation function.

The motorized electromechanical system 8 applies a force Fa to the primary disc 6, so that the primary lever 106, through the bearing 7, applies a force Ft to the force transferring lever 123, which in turn is keyed on the secondary disc 22, which performs the function of mobile fulcrum of the lever system.

The generator further comprises a device 31 with sliding slides, thereto both the force transferring lever 123 and the energy storage member 32 are connected. According to the herein described example, such member 32, as already said, is represented by a spring apt to work under compression, which consequently will be compressed with respect to its resting configuration, thus storing a certain quantity of energy during a charging phase.

In the phase of compressing the elastic member 32, in order to reduce to the minimum the force required to the compression of the same, the laws of physics were applied, relating to the angular momentum of a body which rotates with respect to a point in the space, since the centre of the rotating axis 36, the centre of the rotation axis 12 of the primary disc 6, the centre of the rotation axis of the bearing 7 and the point for applying the force produced by the primary lever 106 on the transferring lever 123, being applied perpendicularly to its surface, are aligned on the same reference plane.

The energy stored by the elastic member 32, in the subsequent release phase, could be discharged by the elastic member itself on the arm of the crank 130—implemented by means of the rotating member 30—connected mechanically to the axis 36 of the motion generator, thus transforming in this way the force created by the primary lever 106 in a rotary motion of the output member.

Once the elastic body 32 has discharged the energy deriving from its compression, the position sensor 39 gives the consent to the control electronic circuit to the motorized electro-mechanical system 8 so as to make the primary disc 6 to rotate backwards, as far as a position sensor 10, connected to the control electronic circuit 34, gives the consent of the reached cycle start position. Furthermore, the control electronic circuit controls the motorized electromechanical system 21 so as to make the secondary disc 22 to rotate forward, until a position sensor 24, connected to the control electronic circuit 34 with implemented acceleration compensation function, gives the consent of the reached cycle start position, by making a new cycle with a new charging phase and a new release phase to re-start. By repeating cyclically this sequence a continuous motion of impulsive type is obtained.

The sizing of the various mechanical, electro-mechanical components and of the control system depends upon the output power which is wanted to be obtained.

For a correct development, shown by way of example and not with limitative purposes of this new motion generator, for example it is possible to start with a value of the torsional momentum which is wanted to be available at the output member, then at the rotating axis 36, by consequently sizing the arm of the crank 30 depending upon the force that the elastic member 32 will return during the release phase, having previously stored it during the charging phase. The force transferring lever 123, keyed on the disc 22, should be sized so that upon the total compression of the elastic member 32, the motor arm 124 has a length greater than or equal to the resistance arm 125, this to make to have an advantageous lever or the sum of the momentums equaling to zero.

The motorized electromechanical system 21, managing the secondary disc 22, should be sized so as to be able to shift and subsequently brake the secondary disc 22 during the charging phase of the elastic member 32, taking into consideration the forces resting on the secondary disc 22, which are the sum of the forces/momentums produced by the primary disc 6 and the elastic member 32. In turn, the primary disc 6 should be sized by optimizing the motor arm 107 of the primary lever 106, which creates between the primitive diameter of the primary disc 6 and the centre of its rotation axis 12, and the resistance arm 108 which creates between the centre of its rotation axis 12 and the bearing 7, by applying the angular momentum of a body which rotates with respect to a point in the space.

In fact, once the charging phase of the elastic member or a pair of components of magnetic type 32 is completed, the centre of the rotating axis 36, the centre of the rotation axis 12 of the primary disc 6, the centre of the rotation axis of the bearing 7 and the point for applying the force produced by the lever of the primary disc 6 on the transferring lever 123, applied perpendicularly to its surface at the end of the charging cycle, are aligned on the same reference plane, by making that the angle α which forms during the charging phase between the reference plane and the resistance arm 108 in an indicative way is comprised between 0° and 20°, depending upon the features of the elastic member or the pair of selected components of magnetic type 32.

In this way a very high effectiveness is obtained and the force 20 necessary to the compression of the elastic member 32 is reduced to the minimum, which force is produced by the motor 8 with the torsional momentum, by creating the force required to the compression of the energy storage element 32.

The technical knowledge and the cunning devices necessary for a practical implementation thereof are considered to be within the comprehension of a person skilled in the art, therefore they will not be further examined deeply.

Given the particular configuration and operation mode, one prefers to select an elastic member or a pair of components of magnetic type 32 with a very short stroke in relation to the force necessary to create the torsional momentum required to the rotating axis 36. The types and features of the elastic or magnetic members 32 are well known to a person skilled in the art, therefore a detailed description thereof will not be given.

Furthermore, according to the needs it is possible to connect to the rotating axis 36 a multiplier 37 and/or a kinetic energy storage device 38, for example a flywheel, to adjust the motion itself.

It is to be meant that a motion generator according to the present invention in case could provide more than one energy storage member. By way of example, the generator could easily be equipped with several lever systems like the described one, for example four lever systems arranged symmetrically along the system discs.

Furthermore, a motion generation system according to the present invention, in case could include a plurality of generators of the type described up to now, for example coupled in parallel therebetween and all acting on the same output member by obtaining a higher power as output.

Figure 7:
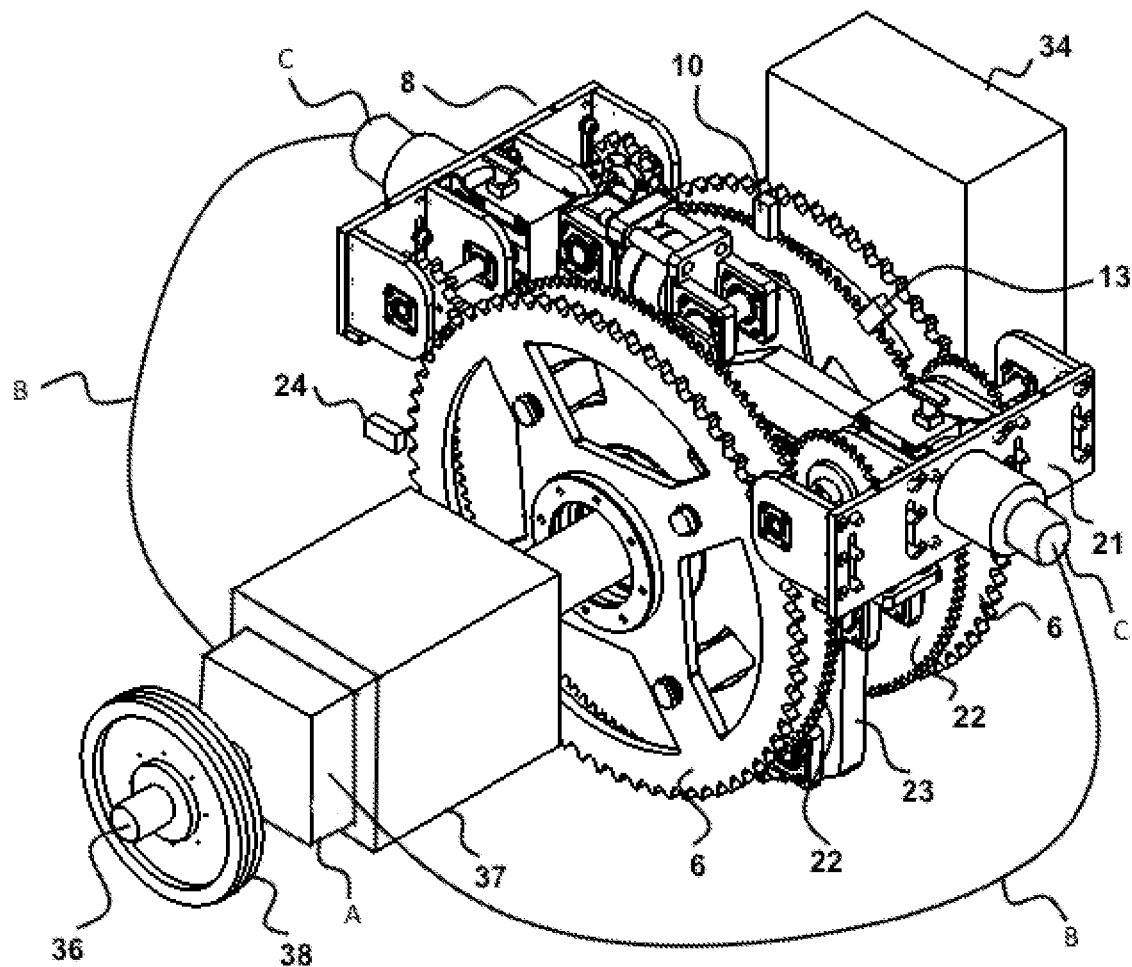
FIG. 7 illustrates in perspective way a motion generation system, thereto the present invention relates, according to an additional embodiment.

Moreover, according to an additional embodiment of the present invention exemplified in FIG. 7, a motion generator (and then a corresponding motion generation system) can be equipped with a recovery device A, B, C to improve the effectiveness in the means for actuating the lever system. Such recovery device for example would allow to take a portion of the motion produced on the output member 36 by means of a mechanical system A and to transfer it to the motorized electro-mechanical systems 8 and 21 for example by means of mechanical transmissions B, in case coupled with clutches C of mechanical or electromechanical type connected to and managed by the control unit 34.

The technical modes for implementing and controlling such recovery system are to be considered within the comprehension of a person skilled in the art and then they will not be further described herein.

Sizing Example

By pure way of example a calculation of the sizing of a motion generator according to the present invention is shown hereinafter.

Let's assume to aim at obtaining a torsional momentum equal to 91 Nm at the rotating axis 36.

In order to obtain it a force of 350 N should be applied to a crank of 0.26 m, therefore there results $$350(N) \times 0.26(m) = 91(Nm).$$

The force transferring lever 123, keyed on the secondary disc 22 performing the function of rotating mobile fulcrum, could have a motor arm 124 of 0.2 m and a resistance arm 125 of 0.15 m, so as to obtain an advantageous lever or the sum of momentums equal to zero at the total compression of the elastic member 32, therefore it is irrelevant in the energy balance.

The motor arm 107 of the primary lever 106 can be of 0.26 m, its resistance arm 108 is 0.1 m, therefore at the end of the charging cycle of the elastic or magnetic member 32, the maximum force of 350 (N) is obtained without any additional or external energy requirements applied to the arm of the crank 30.

Hereinafter by way of example, with reference to the configuration of FIG. 1, Table 1 is shown wherein the values of the force Fx applied to the elastic member 32 and the corresponding elastic deformation of the element 32 (arrow), upon varying the angle α, are illustrated, together with the course of the momentum applied to the elastic member 32 during the compression phase. Of course, the losses by friction introduced by the components used in this particular configuration could be taken into consideration, by considering them in the calculation of the general sizing. The technical knowledge and the cunning devices necessary to a practical implementation thereof are considered to be within the comprehension of a person skilled in the art, therefore they will not be further discussed.

TABLE 1

| Variable moment on the elastic member during the compression phase |||||||
| Elastic member || | Resistance arm | | | | |
| FX (N) | Length mm | Arrow mm | length (m) | FX (N) | Grades > Alfa | Sen > Alfa | Torque > Nm |
| --- | --- | --- | --- | --- | --- | --- | --- |
| 0 | 100 | 0 | 0.10 | 0 | 20 | 0.342 | 0.00 |
| 50 | 99 | 1 | 0.10 | 50 | 18.5 | 0.317 | 1.59 |
| 75 | 98 | 2 | 0.10 | 75 | 17.1 | 0.294 | 2.21 |
| 100 | 97 | 3 | 0.10 | 100 | 15.6 | 0.269 | 2.69 |
| 125 | 96 | 4 | 0.10 | 125 | 14.2 | 0.245 | 3.07 |
| 150 | 95 | 5 | 0.10 | 150 | 12.7 | 0.220 | 3.30 |
| 175 | 94 | 6 | 0.10 | 175 | 11.2 | 0.194 | 3.40 |
| 200 | 93 | 7 | 0.10 | 200 | 9.7 | 0.168 | 3.37 |
| 225 | 92 | 8 | 0.10 | 225 | 8.1 | 0.141 | 3.17 |
| 250 | 90 | 10 | 0.10 | 250 | 6.6 | 0.115 | 2.87 |
| 275 | 88 | 12 | 0.10 | 275 | 5 | 0.087 | 2.40 |
| 300 | 86 | 14 | 0.10 | 300 | 3.4 | 0.059 | 1.78 |
| 325 | 84 | 16 | 0.10 | 325 | 1.8 | 0.031 | 1.02 |
| 350 | 82 | 18 | 0.10 | 350 | 0.1 | 0.002 | 0.06 |

As far as the motorized electro-mechanical systems 8, 21 are concerned, they will be sized so as to be able to provide a torsional momentum of 5.20 Nm, to brake the primary disc 6 at the end of the charging phase and to brake the secondary disc 22 during the charging phase.

The present invention has been so far described with reference to a preferred embodiment thereof. It is to be meant that other embodiments may exist belonging to the same inventive core, all within the protective scope of the here-below reported claims, further being able to replace each detail with to another technically equivalent detail.

The invention claimed is:

1. A rotary motor, comprising:
   at least one energy storage component connected to an output member from which generated motion is to be taken by a crank;
   a lever system for application of a charging force (Fc) to the at least one energy storage component;
   an actuation portion for actuating the lever system, comprising one or more motorized electro-mechanical systems to be powered by an external electric power source and configured so that the charging force (Fc) is cyclically applied to the at least one energy storage component, a cycle comprising a charging phase alternated to a release phase;
   wherein the output member is moved by the energy released by the at least one energy storage component during the release phase, and
   wherein the lever system comprises:
      a transferring lever placed so as to exert a charging force (Fc) on at least one energy storage component;
      a primary lever configured to exert a transferring force (Ft) on the transferring lever; and
      the crank, hinged at a fulcrum of the primary lever, so as to receive a force (Fs) from at least one energy storage component during the release phase.

2. The motor according to claim 1, wherein the primary lever is a primary disc rotating around an axis and bearing a cam member, the primary lever having the fulcrum at the rotation center of the primary disc, a first motor arm equal to the radius of the primary disc and a second resistance arm equal to the distance between the rotation center and the cam element.

3. The motor according to claim 2, wherein the transferring lever is mounted and hinged at the fulcrum, on a secondary disc rotating and coaxial with respect to the primary disc.

4. The motor according to 3, wherein the actuating means comprises a second motorized electro-mechanical system controlled so as to make the secondary disc to rotate in both directions and/or to brake during the charging phases.

5. The motor according to claim 2, wherein the actuating means comprises a first motorized electro-mechanical system controlled so as to make the primary disc to rotate in both directions during the charging phases and/or repositioning phases for a subsequent charging phase.

6. The motor according to claim 3, wherein the actuation portion is controlled so as to bring, after the release phase, the primary disc and the secondary disc, respectively, in a position corresponding to a subsequent cycle.

7. The motor according to claim 3, comprising a recovery device for taking a portion of the energy at the output of the generator and using the energy for moving the primary disc and secondary disc.

8. The motor according to claim 1, wherein the crank is a rotating member, hinged at the center of the primary disc and of the secondary disc.

9. The motor according to claim 1, comprising a sliding device for mounting the energy storage component.

10. The motor according to claim 1, wherein the energy storage component by comprises an elastic member.

11. The motor according to claim 1, wherein the energy storage component by comprises a pair of magnetic members.

12. A motion generation system, comprising two or more motors according to claim 1, coupled in parallel therebetween and acting on a same output member.

* * * * *